United States Patent [19]
Sakaya et al.

[11] Patent Number: 5,854,326
[45] Date of Patent: Dec. 29, 1998

[54] GAS BARRIER RESIN COMPOSITION AND PROCESS FOR PRODUCING THE SAME

[75] Inventors: Taiichi Sakaya, Takatsuki; Ryuma Kuroda, Ibaraki; Tadatoshi Ogawa, Toyonaka, all of Japan

[73] Assignee: Sumitomo Chemical Company, Limited, Osaka, Japan

[21] Appl. No.: 704,839

[22] Filed: Aug. 28, 1996

[30] Foreign Application Priority Data

Aug. 29, 1995 [JP] Japan ................................. 7-220255

[51] Int. Cl.$^6$ ....................................................... C08K 3/34
[52] U.S. Cl. ........................ 524/445; 524/447; 524/449; 524/496
[58] Field of Search ............................. 523/205; 524/439, 524/445, 447, 449, 492

[56] References Cited

U.S. PATENT DOCUMENTS

| | | | |
|---|---|---|---|
| 4,371,642 | 2/1983 | Jaffe | 523/205 |
| 4,739,007 | 4/1988 | Okada et al. | 524/789 |
| 4,785,031 | 11/1988 | Scarso | 523/205 |
| 5,023,286 | 6/1991 | Abe | 524/449 |
| 5,068,276 | 11/1991 | Suitch | 524/447 |
| 5,236,989 | 8/1993 | Brown | 524/447 |
| 5,362,517 | 11/1994 | Flesher | 523/205 |
| 5,412,018 | 5/1995 | Krivak | 524/492 |
| 5,428,094 | 6/1995 | Tokoh et al. | 524/379 |
| 5,433,777 | 7/1995 | Sheppard | 524/445 |
| 5,567,355 | 10/1996 | Wessling | 524/439 |

FOREIGN PATENT DOCUMENTS 0 590 263 A2   4/1994   European Pat. Off. .

Primary Examiner—Paul R. Michl
Attorney, Agent, or Firm—Pillsbury Madison & Sutro LLP

[57] ABSTRACT

A resin composition comprising 100 parts by weight of an aggregated inorganic layer compound and 200–10,000 parts by weight of a resin, the particle size of the aggregated inorganic layer compound satisfying the mathematical expressions (1):

$$5 < D/L \text{ and } 1 \, \mu m < D < 1{,}000 \, \mu m \qquad (1)$$

wherein L is the average particle diameter of the inorganic layer compound before aggregation and D is the average particle diameter of the inorganic layer compound after aggregation (average aggregated particle diameter), and a process for producing the resin composition described above which comprises a process of dispersing the inorganic layer compound in a dispersion medium to obtain a liquid dispersion of the inorganic layer compound (hereinafter referred to as process 1), a process of aggregating the inorganic layer compound present in the liquid dispersion obtained by the process 1 (hereinafter referred to as process 2), and a process of compounding the liquid dispersion of the inorganic layer compound aggregated by the process 2 with the resin (hereinafter referred to as process 3).

The resin composition of the present invention tion is excellent in gas barrier property, particularly in oxygen barrier property.

14 Claims, No Drawings

GAS BARRIER RESIN COMPOSITION AND PROCESS FOR PRODUCING THE SAME

BACKGROUND OF THE INVENTION

The present invention relates to a resin composition excellent in gas barrier property, particularly in oxygen barrier property, and a process for producing the same. The present invention further relates to a laminate having at least one layer of the resin composition excellent in gas barrier property and to a coating film comprising the resin composition.

A variety of functions are required for packaging materials, among which the gas barrier efficiency against various gases (hereinafter referred to as gas barrier property) for protecting the content of packages is an important property which governs the storability of foods. With recent change in the form of merchandise distribution and in the taste of customers, diversification of packaging technologies and increased regulation on additives, the gas barrier property is becoming one of the increasing more important properties. Main factors which cause the degradation of foods include oxygen, light, heat, moisture, etc. In particular, oxygen is a major factor which causes the degradation of foods. Barrier materials formed of metals, glass, and the like, which have a good gas barrier property and effectively prevent the permeation of oxygen, are indispensable materials in such means of preventing the degradation of foods as the inert gas packed packaging and the vacuum packaging. Furthermore, barrier materials which have barrier functions not only against oxygen but also against various other gases, organic solvent vapors, fragrances, etc. are effective in preventing corrosion, odor and sublimation, and hence are used in many fields, including foods (e.g., as candy bags, dried-bonito shaving packages, retort pouches and carbon dioxide-containing beverage containers), cosmetics, agricultural chemicals and medical supplies.

However, in general, resins are rather poor in gas barrier property and hence were unsatisfactory as barrier materials used for the aforesaid purposes. A widely known method used for the purpose of improving the gas barrier property of resin is to disperse a filler, particularly inorganic layer compounds, into the resin. For example, JP-A-64-43554 discloses a process which comprises dispersing mica or talc into a saponification product of ethylene-vinyl acetate copolymer (hereinafter sometimes abbreviated as EVOH). However, resin compositions obtained by such a process are poor in the dispersion of inorganic layer compounds in the resin and show a greatly deteriorated transparency as compared with the original resin. In order to overcome such disadvantage, various attempts have been made to use an inorganic layer compound which undergoes swelling or cleavage in the dispersion medium, particularly in water. Such inorganic layer compounds are typically represented by layer silicates. As examples of such attempts, JP-A-62-74957 discloses a method wherein, in compounding the inorganic layer compound with polyamide, the inorganic layer compound is dispersed in the monomer and then the monomer is polymerized, and JP-A-5-39392 and JP-A-6-57066 disclose a method wherein, in compounding the inorganic layer compound with EVOH, the inorganic layer compound is swollen or cleaved in an aqueous solvent (water-methanol mixture) and then dispersed in such a state into EVOH. However, the resin compositions obtained by these methods are still unsatisfactory in gas barrier property.

SUMMARY OF THE INVENTION

The object of the present invention is to provide a resin composition comprising a resin and an inorganic layer compound compounded therewith which is excellent in gas barrier property, particularly in oxygen barrier property, even at a low content of the inorganic layer compound.

The present inventors have made extensive study to obtain a resin composition excellent in gas barrier property by compounding an inorganic layer compound with a resin. As a result, the inventors have formed that a resin composition excellent in gas barrier property can be obtained by first aggregating the inorganic layer compound and then compounding the aggregated compound with the resin. The present invention has been accomplished on the basis of above finding.

According to the present invention there are provided a resin composition comprising 100 parts by weight of an aggregated inorganic layer compound and 200–10,000 parts by weight of a resin, the particle size of the aggregated inorganic layer compound satisfying the following mathematical expressions (1):

$$5 < D/L \text{ and } 1 \ \mu m < D < 1{,}000 \ \mu m \tag{1}$$

wherein L is the average particle diameter of the inorganic layer compound before aggregation and D is the average particle diameter of the inorganic layer compound after aggregation (average aggregated particle diameter), and a process for producing the resin composition which comprises a process of dispersing the inorganic layer compound in a dispersion medium to obtain a liquid dispersion of the inorganic layer compound (hereinafter referred to as process 1), a process of aggregating the inorganic layer compound present in the liquid dispersion obtained by the process 1 (hereinafter referred to as process 2), and a process of compounding the liquid dispersion of the inorganic layer compound aggregated by the process 2 with the resin (hereinafter referred to as process 3).

DETAILED DESCRIPTION OF THE INVENTION

The inorganic layer compounds used in the present invention refer to inorganic compounds wherein the unit crystal layers are piled up one upon another to form a layer structure. The term "layer structure"refers to a structure wherein planes formed by closely arranged atoms strongly bonded with covalent bonds or the like are piled up one upon another approximately in parallel with a weak bond strength such as the Van der Waals force. Specific examples of the inorganic layer compound include graphite, phosphoric acid salt derivative type compounds (e.g., zirconium phosphate group compounds), chalcogenites, and clay minerals. The term "chalcogenites" herein refers to dichalcogenites of elements of group IV (Ti, Zr, Hf), group V (V, Nb, Ta) and/or group VI (Mo, W) which are represented by the formula $MX_2$, wherein M is an element mentioned above and X is a chalcogen (S, Se, Te).

Preferably used are inorganic layer compounds which are capable of swelling or cleaving in the dispersion medium used in the process 1 described later, because they give a higher aspect ratio.

The swelling ability or cleaving ability of the inorganic layer compound in the dispersion medium can be evaluated, for example, by the swelling ability test and the cleaving ability test described below. Inorganic layer compounds which show a value of about 5 or more in the swelling ability test or the cleaving ability test are preferred, and those which show a value of about 20 or more are more preferred, because such compounds give a higher aspect ratio. In the swelling ability test or cleaving ability test, a dispersion medium used in the process 1 described later is used as the solvent for dispersing the inorganic layer compound. For example, when the inorganic layer compound is a naturally occurring swellable clay mineral, water is preferably used as the solvent.

Swelling ability test

In a 100-ml measuring cylinder is placed 100 ml of a dispersion medium, and 2 g of an inorganic layer compound is added thereto. After standing at 23° C. for 24 hours, the volume of the inorganic layer compound dispersion layer is read off from the graduation at the interface between the inorganic layer compound dispersion layer and the supernatant liquid. The larger value of the volume shows the higher swelling ability.

Cleaving ability test

A mixture of 30 g of an inorganic layer compound and 1500 ml of a dispersion medium is dispersed in a dispersing machine (Disper-MH-L, a trade name, mfd. by Asada Tekko K.K., blade diameter 52 mm, number of rotation 3100 rpm, vessel volume 3 l, distance between bottom face and blade 28 mm) at a peripheral velocity of 8.5 m/sec at 23° C. for 90 min. Then, 100 ml aliquot of the resulting liquid dispersion is placed in a measuring cylinder. After standing for 60 minutes, the volume of the inorganic layer compound dispersion layer is read off from the interface between the dispersion layer and the supernatant liquid. The larger value of the volume shows the higher cleaving ability.

The inorganic layer compounds which undergo swelling or cleavage in a dispersion medium may be, for example, clay minerals which undergo swelling or cleavage in a dispersion medium. Clay minerals are generally classified into those of a two-layer structure type comprising a tetrahedral layer of silica and an octahedral layer having aluminum, magnesium or the like as the central atom positioned above the tetrahedral layer and those of a three-layer structure type comprising an octahedral layer having aluminum, magnesium, or the like as the central atom and tetrahedral layers of silica holding the octahedral layer therebetween from the both sides. Examples of the former two-layer structure type clay minerals include those of kaolinite group and antigorite group. Examples of the latter 3-layer structure type clay minerals include those of smectite group, vermiculite group and mica group, these groups differing in the number of interlayer cations.

Specific examples of these clay minerals include kaolinite, dickite, nacrite, halloysite, antigorite, chrysotile, pyrophyllite, montmorillonite, beidellite, nontronite, saponite, sauconite, stevensite, hectorite, tetrasilylic mica, sodium teniolite, muscovite, margarite, talc, vermiculite, phlogopite, xanthophyllite, and chlorite.

The average particle diameter L of the aforesaid inorganic layer compound before aggregation is preferably 5 $\mu$m or less to obtain a good film-formability or moldability when the resin composition of the present invention is formed into films or moldings, preferably 0.05 $\mu$m or more to obtain a good gas barrier property, preferably 3 $\mu$m or less to obtain a good film transparency, and preferably 1 $\mu$m or less when the film is used in fields where transparency is important, such as food packaging.

In the resin composition of the present invention, the term "aggregated inorganic layer compounds" refer to those which show particle sizes satisfying the mathematical expressions:

$$5 < D/L \text{ and } 1 \ \mu m < D < 1000 \ \mu m$$

wherein L is the average particle diameter of the compound before aggregation and D is the average particle diameter after aggregation (hereinafter sometimes referred to as average aggregated particle diameter). When the ratio D/L is less than 5 or D is smaller than 1 $\mu$m, the gas barrier property of the resin composition obtained is unsatisfactory. When D is larger than 1000 $\mu$m, the inorganic layer compounds are difficulty dispersible in the resin. Compounds satisfying the mathematical expressions $10 < D/L$ and $5 \ \mu m < D < 100 \ \mu m$ are more preferable. The upper limit of the D/L value is not particularly limited but is usually 500.

The average particle diameter L and the average aggregated particle diameter D can be determined by the static light scattering method. In this method, light is transmitted through a liquid dispersion, and the particle diameter distribution in the dispersion medium is determined from the angular distribution of scattered light intensity. When the turbidity of the liquid dispersion is high and consequently a sufficient transmitted light intensity is not obtained, the use of a measuring cell with a short optical path length is preferable. For example, determination is made by interposing the liquid dispersion between two optical glass plates with a gap of 20–50 $\mu$m. The inorganic layer compound aggregated can be obtained, for instance, by the method mentioned later.

In the resin composition of the present invention, the compounding ratio of the resin to the aggregated inorganic layer compound is preferably not more than 10,000 parts by weight of the resin relative to 100 parts by weight of the inorganic layer compound to obtain a good gas barrier property of the resulting resin composition. The ratio is preferably 200 parts by weight or more of the resin relative to 100 parts by weight of the inorganic layer compound to maintain the good flexibility and processability inherent to the original resin. When the resin composition of the present invention is used for extrusion molding, the ratio is more preferably 1,000–10,000 parts by weight of the resin relative to 100 parts by weight of the layer compound to obtain a good extrusion processability. When the resin composition of the present invention is dispersed in a dispersion medium and then used for coating a separately prepared base resin film, the ratio is more preferably 200–5,000 parts by weight of the resin relative to 100 parts by weight of the layer compound.

Examples of the resin used in the present resin composition include polyolefin resins, such as polyethylene and polypropylene, poly(vinyl alcohol), ethylene-vinyl acetate copolymer saponification products, polyamide, polyester, liquid polymers and epoxy resins. Particularly preferably used among them are poly(vinyl alcohol), ethylene-vinyl acetate copolymer saponification products and polyamide. Poly(vinyl alcohol) (hereinafter sometimes abbreviated as PVOH) is obtained by the hydrolysis (i.e., saponification) of the acetic ester portion of poly(vinyl acetate). The degree of saponification of PVOH is preferably 95% or more, particularly preferably 98% or more to attain good gas barrier property and good moisture resistance. The degree of polymerization is preferably not less than 100 and not more than 20,000.

The ethylene-vinyl acetate copolymer saponication products preferably have an ethylene content of 25–85% by mol to attain good moisture resistance and gas barrier property. The degree of saponification is preferably 96% or more, more preferably 98% or more. Saponification products with an ethylene content of 25–46% by mol show a high oxygen barrier property, whereas those with an ethylene content of 50–85% by mol show an excellent water vapor barrier property; accordingly, in uses where oxygen barrier property is more needed the former products are preferably employed, whereas in uses where water vapor barrier property is more needed, the latter products are preferably employed.

Polyamides have acid amide linkage (—CONH—) in the molecular chain and usually have an average molecular weight of 9,000–40,000. Examples thereof include polymers or copolymers obtained from ε-caprolactam, 6-aminocaproic acid, ε-enantholactam, 7-aminoheptanoic acid, 11-aminoundecanoic acid, 9-aminononanoic acid, α-pyrrolidone, α-piperidone, etc.; polymers or copolymers obtained by polycondensation of diamines, such as hexamethylenediamine, nonamethylene-diamine, undecamethylenediamie, metaxylylenediamine, etc., with dicarboxylic acids, such as terephthalic acid, isophthalic acid, adipic acid, sebacic acid, etc.; and the blends of these polymers and copolymers.

Polyesters are polymers containing ester groups obtained by condensation polymerization of dicarboxylic acids with diols. Examples of the dicarboxylic acid include aliphatic and aromatic dicarboxylic acids, such as terephthalic acid, isophthalic acid, adipic acid, sebacic acid, 2,6-naphthalenedicarboxylic acid, cyclohexanedicarboxylic acid, bis-α,β-(2-chlorophenoxy)ethane-4,4'-dicarboxylic acid, succinic acid, oxalic acid, etc. Examples of the diol include ethylene glycol, 1,4-butanediol, diethylene glycol, polyethylene glycol, neopentyl glycol, cyclohexane dimethanol, polyethylene glycol, etc.

The above-mentioned dicarboxylic acids and diols may respectively be used in a combination of two or more thereof. The polyesters have an intrinsic viscosity of preferably 0.4–2, more preferably 0.5–1, as determined in o-chlorophenol at 25° C. The polyester resin used in the present invention may contain, besides the above-mentioned dicarboxylic acids and diols, other monomers as the comonomer unit so long as their content is not more than 10% by mol. Furthermore, two or more kinds of polyester resins may be melt-blended and used. Polyesters particularly preferably used in the present invention are poly(ethylene terephthalate), poly(ethylene 2,6-naphthalate) and poly [ethylene α,β-bis(2-chlorophenoxy)ethane-4,4'-dicarboxylate].

The liquid polymers include lyotropic principal chain type liquid polymers obtained by condensation polymerization of aromatic diamines with aromatic dicarboxylic acids, e.g., poly(p-phenylene terephthalamide), poly(p-phenylene benzobisthiazole) and ply(terephthaloyl hydrazide); thermotropic principal chain type liquid polymers, e.g., poly(p-hydroxybenzoic acid), copolymers of p-hydroxybenzoic acid with aromatic dicarboxylic acids, such as terephthalic acid and isophthalic acid, and copolymers of p-hydroxybenzoic acid and/or 6-hydroxynaphthoic acid with diols, such as diethylene glycol; and side chain type liquid crystal polymers obtained by reacting these liquid polymers with vinyl polymers through a mesogen group or the like.

The resin composition of the present invention can be produced by compounding the inorganic layer compound aggregated with the resin, for instance, by the method described later. The average aggregated particle diameter D is considered to remain unchanged in the process of compounding with the resin, so that the average aggregated particle diameter D may be measured by the preceding method and the like before compounding with the resin. If necessary, it is also possible that the resin composition of the present invention is formed into a film to characterize the average aggregated particle diameter D by an electron microscope or the like.

The resin composition of the present invention may further contain a dispersion medium, water-soluble high molecular substance, organic electrolyte, or inorganic electrolyte, described later. The content of the dispersion medium is 50–100,000 parts by weight, preferably 200–50,000 parts by weight, more preferably 1,000–20,000 parts by weight relative to 100 parts by weight of the inorganic layer composition.

The process for producing the resin composition of the present invention is described in detail below.

The dispersion medium used in the process 1 of the present invention may be, for example, water, alcohols, such as methanol, polar solvents, such as dimethylformamide, dimethyl sulfoxide and acetone, or mixtures of two or more of these solvents. Water or alcohols, such as methanol, are preferably used because they are industrially more economical and safe and because such dispersion mediums can be easily removed in the process 3 described later.

The process 1 of the present invention is not particularly limited so long as it uses a method which can disperse the inorganic layer compound uniformly in the above-mentioned dispersion medium. Dispersing the inorganic layer compound is conducted preferably at a concentration of the compound of 0.1 to 5% by weight and a temperature range from 20° to 80° C. and preferably with stirring, to attain fine dispersion of the layer compound. The stirring may usually be conducted with an apparatus capable of exerting a high shear for a stirring time of 20–180 minutes. As a more specific example, when montmorillonite is used for instance, dispersion may be conducted at a concentration of 2% by weight or less using water as the dispersion medium and using a stirring apparatus capable of exerting a high shear, e.g. Disper.

In the process 2 of the present invention, the method used for aggregating the inorganic layer compound is not particularly limited so long as the method can give a result such that the average particle diameter L and the average aggregated particle diameter D satisfy the mathematical expressions $5<D/L$ and $1 \mu m<D<1000 \mu m$.

A typical example of the method used for aggregating the inorganic layer compound is to add a compound capable of aggregating the layer compound (hereinafter sometimes referred to as coagulant). The coagulant herein refers to a compound which has an ability to neutralize the electric charge possessed by the inorganic layer compound. It may be, for example, a water-soluble high molecular substance, organic electrolyte and inorganic electrolyte and is preferably soluble in the dispersion medium used in the process 1 described above.

Examples of the water-soluble high molecular substance include polysaccharides and their derivatives, such as methyl cellulose, hydroxyethyl cellulose, hydroxypropyl cellulose, carboxymethyl cellulose, ethyl hydroxyethyl cellulose, hydroxypropyl methyl cellulose, cellulose sulfate, amylose, amylopectin, pullulan, cardlan, xanthane, and chitin; polyacrylic acid, sodium polyacrylate, polybenzenesulfonic acid, sodium polybenzenesulfonate, polyethyleneimine, polyallylamine, its ammonium salt, poly (vinyl thiol), polyglycerol and water-soluble polyamides. Preferred of these are water-soluble polyamides and polysaccharides.

The water-soluble polyamides have acid amide linkages (—CONH—) and further functional groups having a polarity, such as amino groups, in the molecule. Those with an average molecular weight of 3,000–40,000 are preferably used. Examples thereof include polymers or copolymers obtained by condensation polymerization of diethylenetriamine with dicarboxylic acids, such as terephthalic acid, isophthalic acid, adipic acid and sebacic acid; or the blends thereof.

The organic electrolyte and the inorganic electrolyte are compounds which are capable of electrolytically dissociating in the dispersion medium mentioned above and of neutralizing the electric charges possessed by the inorganic layer compound. The organic electrolytes are, for example, cation exchangeable or anion exchangeable organic electrolytes and include, for example, aliphatic or aromatic primary amines, secondary amines, tertiary amines or quaternary ammonium salts; alkyl fatty acids, alkyl sulfuric acids, alkylarylsulfonic acids and sulfosuccinic acid esters. More specifically they may be, for example, aliphatic bases and their salts, such as octadecylamine, dimethyloctadecylamine, and trimethyloctadecylammonium salts; aromatic bases, such as p-phenylenediamine, a-naphthylamine, p-aminodimethylaniline, 2,7-diaminofluorene, p-aminobenzoic acid, phenylalanine and dibenzylamine; heterocyclic aromatic bases having a nitrogen atom, such as piperidine; and the mixtures of two or more thereof.

The inorganic electrolytes may be, for example, the salts of the cations of elements belonging to group 1a, group 2a, group 2b, group 3b and group 6b of the periodic table with the counter ions; and electrically charged colloids, including alumina sols and silica sols which are capable of being positively charged in the dispersion medium and alumina sols and silica sols which are capable of being negatively charged in the dispersion medium. The cations are preferably those of such elements as sodium, potassium, calcium, strontium, barium, magnesium, zinc, aluminum and selenium. Also preferred are alumina sols and silica sols. Particularly preferred from the viewpoint of safety to human bodies are cations of sodium, potassium, calcium, magnesium and aluminum, and alumina sols and silica sols. The counter ions are not particularly limited and may be the hydroxyl ion, chlorine ion, acetate ion, sulfate ion and nitrate ion.

These coagulants may usually be added in the form of their solution in water or the like to the liquid dispersion of the inorganic layer compound obtained in the process 1.

When the organic electrolytes or the salts which can become an inorganic electrolyte in the dispersion medium, described above, are used as the coagulant, the effectiveness of ions, resulting from electrolytic dissociation of the coagulant, in neutralizing the electric charge possessed by the inorganic layer compound increases in the successive order of monovalent ions, divalent ions and trivalent ions, so that the optimum mixing ratio of the coagulant to the inorganic layer compound varies depending on the kind of the coagulant added. A suitable mixing ratio of the coagulant to the inorganic layer compound may be determined by previously obtaining the relation of D measured by the above-mentioned method vs. the amount of the coagulant. When an inorganic salt is used as the aforesaid salt, its amount is, for example, preferably about 500–3,000 mmols in the case of KCl and about 0.5–50 mmols in the case of $CaCl_2$, relative to 100 mg of the ion exchange equivalent of the inorganic layer compound. When the amount is less than the above value, the aggregation effect is small, and the resulting resin composition is insufficiently improved in gas barrier property. When the amount is larger than the value, undesirable secondary effects, e.g., degradation of the resin used, may arise. The mixing ratio of the coagulant to the inorganic layer compound is preferably as small as possible from the viewpoint of reducing such secondary effects and cost.

The method used in the process 2 of the present invention comprises, for example, dispersing the above-mentioned coagulant in a dispersion medium, adding the resulting dispersion to a liquid dispersion obtained in the process 1, and thoroughly stirring the resulting mixture. The time necessary for the aggregation varies depending on the kind of inorganic layer compound used and other factors. Sometimes a long time is necessary for aggregation. Sometimes the mixture is preferably allowed to stand for 24 hours or more to attain aggregation. Sometimes precipitation occurs in the liquid dispersion, making it difficult to obtain ultimately a uniform resin composition of the present invention. It is desirable to proceed to the process 3 with the aggregated inorganic layer compound uniformly dispersed in the liquid. Accordingly, it is necessary to confirm the formation of precipitates by visual observation while simultaneously measuring D. When the formation of precipitates is recognized, it is preferable to proceed to the process 3 quickly.

The method used for the process 3 in the present invention is not particularly limited so long as it can compound the liquid dispersion containing the aggregated inorganic layer compound, obtained in the process 2, with a resin to obtain a resin composition wherein the aggregated inorganic layer compound is uniformly dispersed in the resin. It may be, for example, (1) a method comprising pouring the liquid obtained in the process 2 into the resin, and removing the dispersion medium used in the process 1 while heat-kneading the mixture obtained above, (2) when the resin is soluble in an organic solvent, a method comprising adding the resin dissolved in the organic solvent to the liquid obtained by the process 2, vigorously stirring the resulting mixture to form a uniform dispersion, and then removing the dispersion medium and the solvent from the uniform dispersion, or (3) when the resin is soluble, or dispersible in the form of emulsion, in the dispersion medium used in the process 1, a method comprising adding the resin directly to the liquid obtained by the process 2, dissolving, or dispersing in the form of emulsion, the resin in the liquid, and then removing the dispersion medium by evaporation; or a method comprising adding the resin directly to the liquid obtained by the process 2, dissolving, or dispersing in the form of emulsion, the resin in the liquid, then pouring the resulting solution or emulsion into a medium in which the resin is insoluble and the dispersion medium is soluble, and recovering the resin composition thus precipitated. Preferred of these is the method (1) because of its economical advantage.

The resin composition thus obtained may be in any of the forms of pellet, powder, paste, etc.

The resin composition of the present invention may be incorporated with various ingredients, e.g., other resin compositions, rubber components, fillers, antistatic agents, various stabilizers, nucleating agents, colorants and lubricants, within limits not deleterious to the effect of the present invention.

The resin composition of the present invention may be processed into various formed products, including, for example, film, sheets, tubes, cups and bottles. In the processing, the resin composition of the present invention may be heat-melted and subjected to conventional processing methods, for example, T-die extrusion, inflation processing, injection molding, blow molding, and stretching blow molding. In the case of film or sheets, they may also be subjected to conventional stretching processes, for example, uniaxial stretching, zone stretching, flat successive stretching, flat simultaneous biaxial stretching and tubular simultaneous stretching.

The resin composition of the present invention may be used as at least one layer of a laminate, particularly as the intermediate layer in a laminate comprising 3 or more layers. The term laminate herein refers to a product obtained by laminating the layer of the present resin composition with other resin layer(s). The resins used in the other resin layer are not particularly limited and may be, for example, thermoplastic resins, e.g., polyolefins, such as polyethylene, polypropylene and polybutane, copolymers comprising olefins as the principal monomer units, polystyrene, poly(ethylene terephthalate), polycarbonate, polyamide, ethylene-vinyl alcohol copolymer and poly(vinylidene chloride); or the mixtures thereof. Particularly preferably used among them are polyethylene, polypropylene, or the mixture thereof.

The method used for obtaining a laminate having at least one layer of the resin composition of the present invention is not particularly limited and may be, for example, the coextrusion process, melt coating process, extrusion lamination process and dry lamination process.

When the adhesion between the layer of the present resin composition and the layer of other resin is not sufficient, it is advisable to provide, additionally, an adhesive resin layer between the two layers. The adhesive resin is not particularly limited so long as it does not cause delamination during the use of the laminate in practice. A typical example is a modified olefin polymer containing carboxyl groups obtained by chemically bonding (for example, through addition or grafting) an unsaturated carboxylic acid or its anhydride to an olefin polymer (polyolefins or polymers comprising olefin as the main monomer units, such as polyethylene, polypropylene and polybutene).

Specific examples of preferred adhesive resins include maleic anhydride graft modified polyethylene, maleic anhydride graft modified polypropylene, maleic anhydride graft modified ethylene-ethyl acrylate copolymer, maleic anhydride graft modified ethylene-vinyl acetate copolymer, and ionomer resin; used each alone or as a mixture of two thereof.

The resin composition of the present invention may be worked up into a coating film. For example, the resin composition of the present invention is dispersed in a suitable dispersion medium, the resulting liquid is coated on a base film, and then the dispersion medium is removed by drying, to obtain a coating film. The base film used herein may be a film previously formed by using the same resin as used in the other resin layer of the aforesaid laminate.

The formed products thus obtained may favorably be employed in various uses, including general food packaging, retort food packaging, medicine packaging, electronic part packaging and gasoline tanks.

According to the present invention, there is provided a resin composition which comprises an aggregated inorganic layer compound and a resin and is excellent in gas barrier property, particularly in oxygen barrier property.

The reason why a resin composition excellent in gas barrier property can be obtained by aggregating an inorganic layer compound and compounding the aggregated compound with a resin according to the present invention is not yet clear. It is estimated, however, that by aggregation of the inorganic layer compound the layer compound forms secondary aggregates having larger particle diameters than the actual diameters and resultantly disperses with a substantially higher aspect ratio in the resin composition, to develop an excellent gas barrier property.

DESCRIPTION OF PREFERRED EMBODIMENTS

The present invention is described in detail below with reference to Examples, but the invention is in no way limited thereto.

The methods of determination of the physical properties shown in the present specification are described below.

Oxygen permeability

The oxygen permeability was determined with an oxygen permeability measuring instrument (trade name: OX-TRAN 100 type, mfd. by MOCON Corp., USA) at room temperature and at relative humidity (RH) of 0.2% or 98%. The oxygen permeability of the resin composition of the present invention is very low and, in determination at room temperature, is often less than the measurable limit of the sensor. In such cases (Examples 1–9), oxygen permeability was evaluated at 130° C. and at a dry state as an acceleration test. This temperature condition is close to the heat treatment temperature condition in retort packaging and thus provides a practically useful method of evaluation of gas barrier property. In an oven at 130° C. was placed a cell on which a sample film with a measuring area of 5 cm$^2$ can be mounted, and a test gas was introduced to the cell and led to the oxygen permeability measuring instrument to conduct determination. The value measured 8 hours after setting the sample film was taken as the stationary value.

Particle diameter determination

The particle diameter L and the average aggregated particle diameter D were determined with a commercial particle size distribution measuring instrument by laser scattering (trade name: LA-910, mfd. by Horiba Seisakusho K.K.) using the paste cell method. The paste cell method is a method wherein determination is made by interposing a liquid dispersion between two optical glass plates placed in parallel with a gap of 20–50 μm. In this method, even when the turbidity of the liquid dispersion is high, the particle diameter of the inorganic layer compound in the liquid dispersion can be measured directly without dilution with a dispersion medium. As parameters in the determination, the refractive index of the dispersion medium (in the case of water, for example, $n_D^{25}$=1.332) and the refractive index of the inorganic layer compound (in the case of montmorillonite, for example, $n_D^{25}$=1.56) were input to the measuring system.

EXAMPLE 1

Process 1

A natural montmorillonite (trade name: Kunipia F, mfd. by Kunimine Kogyo K.K.) was used as the inorganic layer compound. It was dispersed in deionized water (electric conductivity: 0.7 μs/cm or less) to give a concentration of 2% by weight. Then 300 parts by weight of methanol was added to 100 parts by weight of the liquid dispersion prepared above to obtain a liquid dispersion of the inorganic layer compound in water-methanol (hereinafter abbreviated as liquid dispersion 1). The montmorillonite used had a particle diameter L of 0.56 μm, basal place spacing of 1.2156 nm as determined by the powder X-ray diffraction method and aspect ratio of 461 (for details of the X-ray diffraction method, reference may be made, for example, to "A guide to instrumental analysis (a)", p. 69 (1958), supervised by Jiro Shiokawa, published by Kagaku Dojin K.K.).

Process 2

In a glass-made sample bottle was placed 80 g of the liquid dispersion 1, then 36% by weight hydrochloric acid was added thereto such that its amount might be 87 mmols as hydrogen chloride per 100 g of the natural montmorillonite, the resulting mixture was stirred and allowed to stand for 12 hours. The average aggregated particle diameter D after the still standing was 72 $\mu$m and the ratio D/L was 129.

Process 3

To the liquid obtained by the process 2 was added 4 g (corresponding to 1000 parts by weight relative to 100 parts by weight of the inorganic layer compound) of an ethylene-vinyl alcohol copolymer with an ethylene content of 32% by mole (EVOH-F, a trade name, mfd. by Kuraray K.K., hereinafter sometimes abbreviated as EVOH-F). The glass-made sample bottle containing the resulting mixture was kept in a ultrasonic bath at 67° C. for 2 hours to effect dissolution, whereby a uniform solution was obtained. The solution was poured into 4 l of vigorously stirred cold water, the precipitate thus formed was collected, washed thoroughly with water and then dried to obtain a resin composition. The resin composition was pressed at 200° C. to obtain a film 30 $\mu$m in thickness. On determination of oxygen permeability, the film showed an excellent oxygen barrier property as shown in Table 1.

EXAMPLES 2 and 3

The procedures of Example 1 were repeated except that the amount of hydrochloric acid added in the process 2 was changed as shown in Table 1. The resin compositions thus obtained were each excellent in oxygen barrier property.

EXAMPLES 4–9

The procedures of Example 1 were repeated except that, in the process 2, potassium chloride or calcium chloride was added in amounts shown in Table 1 in place of hydrochloric acid. The resin compositions thus obtained were each excellent in oxygen barrier property.

Comparative Example 1

The procedures of Example 1 were repeated except that hydrochloric acid was not added in the process 2. The resin composition thus obtained was poor in oxygen barrier property.

Referential Example 1

As a referential example, the oxygen barrier property of EVOH-F which does not contain anything is shown in Table 1.

TABLE 1

| | Inorganic layer compound | | | Coagulant | | | | Resin | | Relative |
|---|---|---|---|---|---|---|---|---|---|---|
| | Kind | Amount (pt by wt.) | L ($\mu$m) | Kind | Amount (mmol) | D ($\mu$m) | D/L | Kind | Amount (pt by wt.) | OTR *1 |
| Example 1 | Natural Montmorillonite | 100 | 0.56 | HCl | 87 | 72 | 129 | EVOH-F | 1000 | 0.01 |
| Example 2 | | | | | 250 | 80 | 143 | | | <0.01 |
| Example 3 | | | | | 560 | 90 | 161 | | | <0.01 |
| Example 4 | | | | KCl | 1780 | 30 | 54 | | | 0.09 |
| Example 5 | | | | CaCl$_2$ | 1.3 | 70 | 125 | | | 0.05 |
| Example 6 | | | | | 2.6 | 85 | 152 | | | 0.01 |
| Example 7 | | | | | 5.2 | 95 | 170 | | | 0.02 |
| Example 8 | | | | | 12 | 96 | 171 | | | 0.04 |
| Example 9 | | | | | 24 | 98 | 175 | | | 0.06 |
| Comparative Example 1 | | | | — | — | 0.56 | 1 | | | 0.25 |
| Referential Example 1 | — | — | — | — | — | — | — | | | 1.00 |

Note*
*1Oxygen transmission rate (OTR) relative to OTR of EVOH-F taken at 1. Actual value of OTR of EVOH-F was 1,000 cc · 15 $\mu$m/m$^2$ · day · atm.

EXAMPLE 10

Process 1

40 grams of a natural montmorillonite (trade name: Kumipia F, mfd. by Kunimine Kogyo K.K.), used as the inorganic layer compound, was added to 1960 g of deionized water (electric conductivity: 0.7 $\mu$S/cm or less), and dispersed thereinto with stirring in a dispersing machine (Disper MH-L, a trade name, mfd. by Asada Tekko K.K., blade diameter 52 mm, vessel volume 3 l, distance between bottom face and blade 28 mm) at 60° C. and at a number of rotation of 1500 rpm and a peripheral velocity of 6.2 m/sec for 2 hours to obtain a liquid dispersion of the inorganic layer compound having a concentration of 2% by weight (hereinafter referred to simply as liquid dispersion 2). The montmorillonite used had a particle diameter L of 0.56 $\mu$m, basal plane spacing of 1.2156 nm as determined by powder X-ray diffraction and aspect ratio of 461.

Process 2

In a dispersing machine (Disper-MH-L) was charged 1000 g of the liquid dispersion 2 obtained above and, while the liquid dispersion 2 was being stirred at 60° C. and at a number of rotation of 2250 rpm and a peripheral velocity of 6.2 m/sec, 100 g of alumina sol dispersion solution (Alumina sol-520, a trade name, mfd. by Nissan Kagaku K.K., $Al_2O_3$ 20% by weight, pH 3.9) was added as a coagulant, and further stirred for 1 hour. After completion of the stirring, the average aggregated particle diameter D was 9.1 μm and D/L was 16.

Process 3

A mixture of 200 g of poly(vinyl alcohol) having a polymerization degree of 1700 and saponification degree of 99.6 (PVA 117H, a trade name, mfd. by Kuraray K.K., hereinafter abbreviated as PVA117H) and 1800 g of deionized water was stirred in a dispersing machine (Disper-MH-L) at 95° C. and at a peripheral velocity of 4.1 m/sec for at least 1 hour to obtain a 10% by weight aqueous PVA117H solution. Then, 1100 g of the liquid obtained by the above process 2 was charged in a dispersing machine (Disper-MH-L) and, while the liquid was being stirred at 60° C. and at a number of rotation of 2250 rpm and a peripheral velocity of 6.2 m/sec, 400 g of the 10% by weight aqueous PVA117H solution obtained above was added thereto, and further stirred for 1 hour. Resultantly, a mixed aqueous dispersion consisting essentially of inorganic layer compound, resin and coagulant in a weight ratio of 1:2:1 was obtained.

The mixed aqueous dispersion obtained in the process 3 was continuously coated on a biaxially oriented polyproylene film (OPP, thickness 20 μm), used as the base film, with a reverse gravure coater (Multi-purpose Coater CR 3-300, a trade name, hereinafter abbreviated as MPC, mfd. by Tsutsui Seiki K.K.). The resulting film was washed in deionized water and dried to obtain a coating film (coating film thickness; 512 nm). The coating film thus obtained showed an oxygen transmission rate (23° C., cc/$m^2$·atm·day) of 0.41 (at 0.2% RH) and 41.9 (at 98% RH) as shown in Table 2 and is thus excellent in gas barrier property.

Comparative Example 2

The procedures of Example 10 were repeated except that alumina sol of the coagulant was not added, to obtain a coating film (coating film thickness: 448 nm). The coating film thus obtained showed an oxygen transmission rate (23° C., cc/$m^2$·atm·day) of 0.97 (at 0.2% RH) and 73.8 (at 98% RH) as shown in Table 2 and is thus poor in gas barrier property.

EXAMPLE 11

The procedure of Example 1 was repeated except that, in the process 2, the alumina sol dispersion solution of Example 10 was added in amounts shown in Table 3 in place of hydrochloric acid. The resin composition thus obtained was excellent in oxygen barrier property.

Comparative Example 3

The procedure of Example 11 was repeated except that the alumina sol dispersion solution was not added in the process 2. The resin composition thus obtained (the composition obtained by Comparative Example 1) was poor in oxygen barrier property.

Comparative Example 4

The procedure of Example 11 was repeated except that the natural montmorillonite was not added in the process 1. The resin composition thus obtained was poor in oxygen barrier property.

Reference Example 2

As a referential example, the oxygen barrier property of EVOH-F which does not contain anything is shown in Table 3.

TABLE 2

| | Inorganic layer compound | | | Coagulant | | | | Resin | | OTR |
|---|---|---|---|---|---|---|---|---|---|---|
| | Kind | Amount (pt by wt.) | L (μm) | Kind | Amount (pt by wt.) | D (μm) | D/L | Kind | Amount (pt by wt.) | (23° C. cc/$m^2$ · atm · day) |
| Example 10 | Natural montmorillonite | 100 | 0.56 | Alumina sol | 100 | 9.1 | 16 | PVA117H | 200 | 0.41 (0.2% RH) 41.9 (98% RH) |
| Comparative Example 2 | Natural montmorillonite | 100 | 0.56 | — | 0 | 0.56 | 1 | PVA117H | 200 | 0.97 (0.2% RH) 73.8 (98% RH) |

TABLE 3

| | Inorganic layer compound | | | Coagulant | | | | Resin | | |
|---|---|---|---|---|---|---|---|---|---|---|
| | Kind | Amount (pt by wt.) | L ($\mu$m) | Kind | Amount (pt by wt.) | D ($\mu$m) | D/L | Kind | Amount (pt by wt.) | OTR [*2] |
| Example 11 | Natural Mountmorilonite | 100 | 0.56 | Al$_2$O$_3$ | 100 | 56 | 100 | EVOH-F | 1000 | <0.3 |
| Comparative Example 3 | | | | — | — | 0.56 | 1 | | 1000 | 2.9 |
| Comparative Example 4 | — | — | — | Al$_2$O$_3$ | 100 | — | — | | 1000 | 30.0 |
| Referential Example 2 | | | | — | — | | | | — | 25.0 |

[*2] Oxygen transmission rate: 23° C., 100% RH, cc · 15 $\mu$m/m$^2$ · day · atm

What is claimed is:

1. A resin composition comprising 100 parts by weight of an aggregated inorganic layer compound and 200–10,000 parts by weight of a resin, the particle size of the aggregated inorganic layer compound satisfying the following mathematical expressions (1):

$$10 < D/L \text{ and } 5 \,\mu\text{m} < D < 100 \,\mu\text{m} \quad (1)$$

wherein L is the average particle diameter of the inorganic layer compound before aggregation and D is the average particle diameter of the inorganic layer compound after aggregation, i.e., average aggregated particle diameter.

2. The resin composition according to claim 1 which further comprises 50–100,000 parts by weight of a dispersion medium.

3. The resin composition according to claim 1 wherein the inorganic layer compound is at least one member selected from the group consisting of graphite, phosphoric acid salt derivative type compounds, chalcogenites and clay minerals.

4. The resin composition according to claim 1 wherein the resin is at least one member selected from the group consisting of polyolefin resins, poly(vinyl alcohol), ethylene-vinyl acetate copolymer saponification products, polyamides, polyesters, liquid crystal polymers and epoxy resins.

5. The resin composition according to claim 2 wherein the dispersion medium is at least one member selected from the group consisting of water, alcohols, dimethylformamide, dimethyl sulfoxide and acetone.

6. The resin composition according to claim 2 wherein the inorganic layer compound is capable of undergoing swelling or cleavage in the dispersion medium.

7. The resin composition according to claim 6 wherein the degree of swellability or cleavability of the inorganic layer compound determined in the swellability test or the cleavability test is not less than 5.

8. The resin composition according to claim 1 wherein the average particle diameter L of the inorganic layer compound is not less than 0.05 $\mu$m and less than 5 $\mu$m.

9. A process for producing the resin composition according to any one of the claims 1–7 or 8 which comprises a process of dispersing the inorganic layer compound in a dispersion medium to obtain a liquid dispersion of the inorganic layer compound, said process being hereinafter referred to as process 1, a process of aggregating the inorganic layer compound present in the liquid dispersion obtained by the process 1, said process being hereinafter referred to as process 2, and a process of compounding the liquid dispersion of the inorganic layer compound aggregated by the process 2 with the resin, said process being hereinafter referred to as process 3.

10. The process according to claim 9 wherein the process 2 comprises adding at least one compound selected from water-soluble high molecular substances, organic electrolytes and inorganic electrolytes to the liquid dispersion of the inorganic layer compound obtained by the process 1.

11. The process according to claim 9 wherein the process 3 comprises dissolving, or dispersing in the form of emulsion, the resin in the liquid dispersion of the aggregated inorganic layer compound obtained by the process 2, and then removing the dispersion medium.

12. The process according to claim 9 wherein the process 3 comprises adding the liquid dispersion of the aggregated inorganic layer compound obtained by the process 2 to the resin which is being heat-kneaded, and removing the dispersion medium from the system while heat-kneading the system.

13. A laminate which has at least one layer comprising the resin composition according to any one of the claims 1 to 8.

14. A coating film comprising the resin composition according to any one of the claims 1–7 or 8.

* * * * *